United States Patent [19]

Lo Bosco

[11] 4,219,955
[45] Sep. 2, 1980

[54] AUTOMATIC HOOK-FISHING DEVICE

[76] Inventor: Giuseppe Lo Bosco, Via Donatello, 11, 20131 Milano, Italy

[21] Appl. No.: 961,227

[22] Filed: Nov. 16, 1978

[30] Foreign Application Priority Data

Jan. 25, 1978 [IT] Italy .............................. 19596 A/78

[51] Int. Cl.³ ............................................. A01K 97/12
[52] U.S. Cl. ........................................... 43/15; 43/21.2
[58] Field of Search ................................... 43/15, 21.2

[56] References Cited

U.S. PATENT DOCUMENTS

| 693,071 | 2/1902 | Ruud | 43/15 |
|---|---|---|---|
| 2,618,090 | 11/1952 | Kimura | 43/15 |
| 3,154,875 | 11/1964 | Biddison | 43/15 |
| 3,205,606 | 9/1965 | Banta et al. | 43/15 |
| 3,560,969 | 2/1971 | Fleeman | 43/21.2 |

Primary Examiner—Othell M. Simpson
Assistant Examiner—Roscoe V. Parker

Attorney, Agent, or Firm—Bucknam and Archer

[57] ABSTRACT

An improved hook fishing device is described which consists of a base plate provided with side shoulders and capable of being fixed in the ground. A tubular member, located in a vertical plane and adapted to house the end portion of the fishing rod, is pivoted to the plate. A tension spring anchored in the plate holds the tubular member in slanted position. On the opposite side of the spring, is pivoted a small rod adapted to rotate in a vertical plane and provided with a lower tooth capable of engaging with a ridge formed onto the tubular member. At diametrally opposed positions, two movable circle sectors, of suitable width, rigid with the tubular member, are capable of defining a protecting gap for the spring, the two circle sectors cooperate with corresponding circle sectors fixed to the shoulders of the base plate. The movable sectors are effective to rotate in the inside of the fixed sectors and act as stop members for the downward rotation of the tubular member.

1 Claim, 2 Drawing Figures

AUTOMATIC HOOK-FISHING DEVICE

The present relates to an automatic hook-fishing device.

As it is known, in the hook-fishing art, it is of the utmost importance that the fishing-line be immediately recovered, as soon as the fish bites at the hook.

Accordingly, in the practice of this type of fishing, the fisherman has to exercise continuous attention with a remarkable reflex readiness, in order to prevent the fish from leaving the hook.

It is also known that, sometimes, one only fisher locates several fishing rods, fixing in a suitable way said fishing rods in the ground and trying to tempestively act onto one or the other, as the fisherman detects the typical vibration due to the biting of the fish.

In this case, even if the fisher uses optional acoustical signalling devices, such as ringers or the like, mounted at the top of the fishing rods, it is extremely difficult for the fisherman to act or operate, with sufficient readiness, on all said fishing rods.

The preceding practical problem is on the contrary solved by means of the use of a particular mechanical device according to the present invention.

More precisely, this mechanical device is substantially formed by a base plate, provided with side shoulders and capable of being fixed in the ground.

To the aforesaid plate is pivoted, according to a horizontal axis, a tubular member, disposed in a vertical plane and sized in such a way as to house the end portion of a fishing rod, thereby acting as a supporting element therefor.

This tubular member is connected, at one side, to a tension spring, anchored to the aforesaid plate and effective to hold said tube slanted downwardly.

To that same plate is pivoted, from the opposite part with respect to the aforesaid spring, a small rod capable of rotating in a vertical plane and provided, at the free end end thereof, with a ridge carrying a small ball biassed by a spring.

The latching between said small rod and the tube edge is obtained by exploiting the counterbiassing occurring between the inner portion of said edge and the aforesaid small ball.

In this way, by suitably varying the pressure of the spring acting onto the ball, it is possible to predetermine the value of the minimum oscillations deemed necessary to act onto the fishing rod for causing the tube to unlatch.

The aforesaid tube holding action is exercized, with a remarkable sensibility, by the instant device which comprises a small rod provided, at the lower portion thereof, with a suitable tooth. This latter, in fact, is effective to engage with a ridge formed, in a corresponding position, onto the fishing rod supporting tube.

On that same small rod, moreover, presses, by a suitably adjustable intensity, a resilient element effective to allow for a gradual variation of the sensibility of said small rod with respect to the vibrations of the fishing rod to be obtained.

These and other characteristics of the device according to the invention, effective to automatically carry out the hook-fishing, will become more apparent from the figures of the accompanying drawing, in which.

Figure 1:
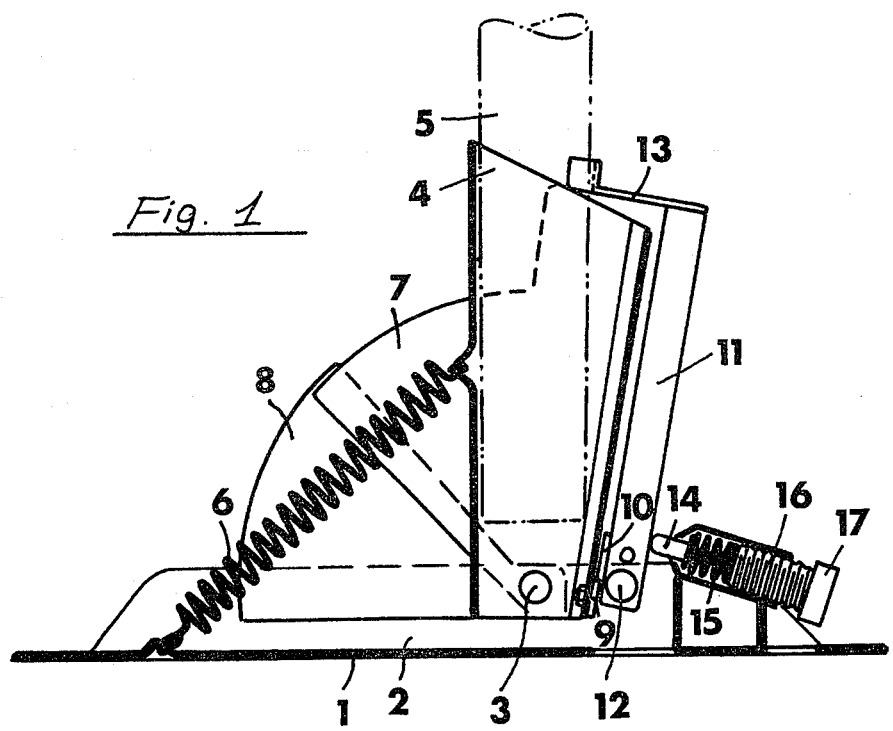
FIG. 1 is a side view of the instant device, as partially sectioned and in the position thereof of arming the fishing rod.
Figure 2:
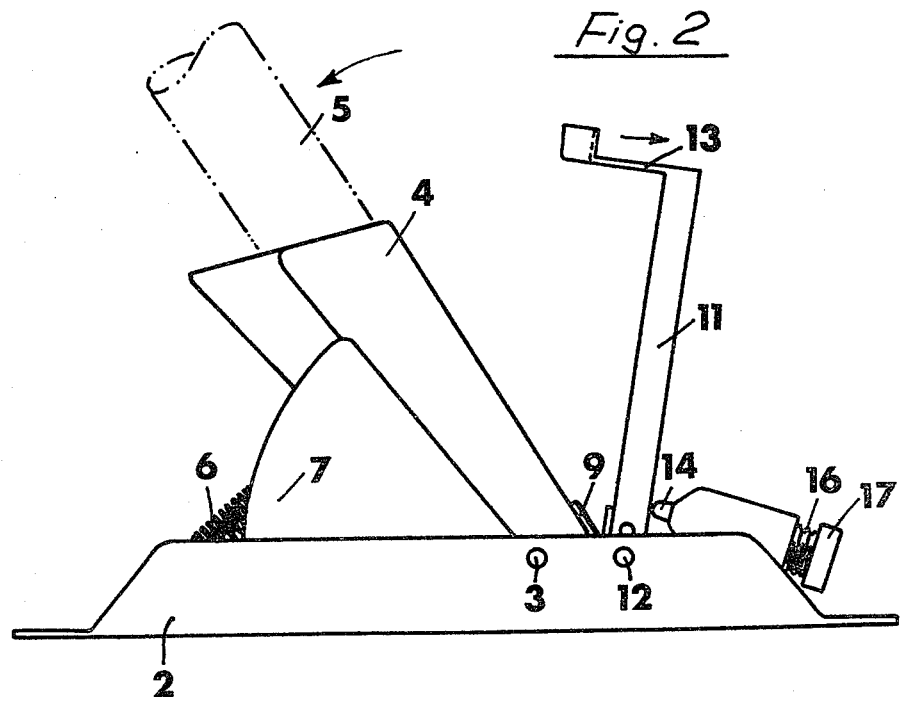
FIG. 2 illustrates that same device in the rest position thereof, upon the recovering of the fishing rod.

Referring particularly to the number references of the figures, the improved mechanical device according to the invention is formed by a base plate 1 effective to be fixed to the ground, for example by means of a plurality of nails inserted in through holes as formed through the thickness of said plate.

This latter is furthermore provided with two parallel side shoulders 2, transversally of which is located a horizontal axle or pin 3.

About this axle or pin is able to rotate a tubular member 4, sized in such a way as to act as a holding and supporting seat for the end portion of a fishing rod 5. This tube length is biassed, on one side, by a tension spring 6 which is respectively fixed, at the two ends thereof, to the plate 1 and to the edge of said tube.

With said tube length 4 are rigid, at diametrically opposite positions, two circle sectors 7 of suitable width, effective to define a protecting gap for the spring 6, by cooperating with corresponding circle sectors 8 fixed to the shoulders 2 of the base plate.

Practically, the movable sectors 7 are effective to rotate in the interior of the fixed sectors 8 and furthermore they act as stop members for the downwardly rotation of the tubular member 4, thereby limiting the maximum stroke thereof.

These same sector pairs 7 and 8 are sized in such a way as to be always partially superimposed to one another, even when the fishing rod is in the operative or allurement position thereof (FIG. 1).

In the part diametrically opposite with respect to the applying point of the recovering spring 6 is formed, onto the tube 4 and at the base thereof, a ridge 9 having a planar upper edge. On said edge is effective to engage, by friction, a tooth 10 formed, in corresponding position, on a small rod 11 pivoted, at the lower end thereof, onto a horizontal axle or pin 12, said small rod being provided, at the top thereof, with a circle arc-shaped portion 13 effective to encompass the fishing rod 5.

On the lower portion of said small rod presses a push-point 14 resiliently biassed by a spring 15, the pressure force thereof may be adjusted by means of a threaded small bar 16 provided with a suitable knurled knob 17.

By this means it is thereof possible to vary, depending on the different needs, the sensibility of said small rod 11 with respect to the fishing rod 5 vibrations, thereby conditioning the range of the minimum unhooking oscillations.

From the above description and the examination of the figures of the accompanying drawing, the greater functionality and practicity of use characterizing the improved device according to the invention are self-evident.

I claim:

1. A device for automatically carrying out the latching of the hook of a fishing rod which comprises a base plate, two parallel shoulders at the sides of the base plate, a tubular member, located in a vertical plane and positioned to house the end portion of the fishing rod, said tubular member being pivoted onto the plate and being connected at one end to a tension spring and being counterbiased at the opposite end by a rod effective to rotate in a vertical plane, said rod being provided with a tooth effective to engage with a suitable ridge formed, at a corresponding position, onto said tubular member, a pair of first circle sectors rigid with said tubular member and positioned at diametrically opposite positions, effective to define a protecting gap for said spring, said first circle sectors cooperating with a second pair of circle sectors fixed to the shoulders of the base plate, said first circle sectors being effective to rotate in the interior of the second pair of sectors and acting as stop members for the downwardly rotation of said tubular member, said rod being pivoted, at the lower end thereof, onto one of said side shoulders, said rod being provided at the top thereof with a circle arc shaped portion, effective to encompass the fishing rod, a pushing point resiliently biased by a second spring urging onto the lower portion of said rod, means for exerting pressure on said rod through said second spring, said means comprising a threaded bar and a knurled knob positioned for engagement with said second spring.

* * * * *